United States Patent
Ferlitsch et al.

(10) Patent No.: US 7,397,578 B2
(45) Date of Patent: Jul. 8, 2008

(54) THUMBNAIL AUDIT TRAIL IN MFP AND PRINT PROCESSOR/SPOOLER-BASED PRINT-JOB AUDITING

(75) Inventors: Andrew R. Ferlitsch, Tigard, OR (US); Roy Chrisop, Camas, WA (US); Daniel Leo Klave, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 872 days.

(21) Appl. No.: 10/387,991

(22) Filed: Mar. 12, 2003

(65) Prior Publication Data
US 2004/0179236 A1 Sep. 16, 2004

(51) Int. Cl.
*G06F 15/00* (2006.01)

(52) U.S. Cl. ............... 358/1.18; 258/1.13; 258/1.16

(58) Field of Classification Search ............ 358/1.18, 358/1.15, 474, 529, 1.13, 1.16, 1.14, 1.2, 358/1.6; 713/201; 726/1; 705/35; 364/413.13
See application file for complete search history.

(56) References Cited

U.S. PATENT DOCUMENTS

| | | | |
|---|---|---|---|
| 5,019,975 A * | 5/1991 | Mukai ............... 707/7 |
| 5,642,199 A | 6/1997 | Ukai et al. |
| 5,720,012 A | 2/1998 | McVeigh et al. |
| 5,771,101 A | 6/1998 | Bramall |
| 6,088,684 A * | 7/2000 | Custy et al. ............ 705/35 |
| 6,181,436 B1 * | 1/2001 | Kurachi ............ 358/1.15 |
| 6,188,766 B1 | 2/2001 | Kocher |
| 6,363,488 B1 * | 3/2002 | Ginter et al. ............ 726/1 |
| 7,133,166 B2 * | 11/2006 | Ferlitsch et al. ......... 358/474 |
| 2002/0054398 A1 * | 5/2002 | Bloomquist et al. ...... 358/529 |
| 2002/0105675 A1 * | 8/2002 | Toyofuku ............ 358/1.15 |

* cited by examiner

*Primary Examiner*—Allen H Nguyen

(57) ABSTRACT

Structure and methodology for creating a content-informative audit trail derived from text, vector information and imagery, and taking the form of a reduced-size data extraction from a document-job data-stream, such as a data-stream which exists in the context of a document printing, copying, scanning, e-mailing, and faxing job, etc. Selected, reduced-content components of a subject document data-stream are extracted according to various extraction approaches, and extracted information is stored in a appropriate storage site for later review to give an indication of just what printing, scanning, copying, etc activity has taken place with respect to different identified documents.

7 Claims, 10 Drawing Sheets

US 7,397,578 B2

THUMBNAIL AUDIT TRAIL IN MFP AND PRINT PROCESSOR/SPOOLER-BASED PRINT-JOB AUDITING

BACKGROUND AND SUMMARY OF THE INVENTION

This invention pertains to apparatus and a method which are useable, in conjunction with the creation of a document data-stream, derived from the initiation of an imaging job, such as a print, copy, scan, fax or e-mail job, to create a storable and reviewable, content-informative audit trail. This audit trail is based upon extraction from such a data-stream of a small quantity of both text and imagery data that are sufficient to furnish a reviewing party with an understanding of the content of the document to which a selected data-stream relates. Audit-trail material is variously referred to herein also as a data-collection content surrogate, and as a data content sub-collection.

Content extraction can take place with respect to each, or less than all, of the different pages in a document. It can relate to portions only of one or more pages in a document, to sub-portions of text and imagery content, and in fact to any other content feature of an imaging job document data-stream which will be sufficient to inform a later-reviewing party about the nature of the content of the document. Additionally, stored audit-trail content material may be derived from a selective practice of abstracting different kinds of information drawn from pages in a document, and it may also be based upon later-performed content extraction from previously extracted material in order to minimize required storage space.

The present invention does not focus attention on any specific algorithm for performing extraction and/or reduction in storage size of extracted data, nor does it depend upon the specific location in a document data-stream and related system from where content extraction takes place. In general terms, such extraction may take place at any point in a system is functionally downstream from the point at which the relevant data-stream is first created or initiated. Further, and as was just suggested briefly above, the invention contemplates that, while a first-level extraction and storage of reduced-content data may be quite sufficient for initial storage purposes, over time it may be desirable to reduce further the storage space occupied by such extracted material by implementing a practice of time-cyclic re-extraction and further reduction of document data content over time. Thus, as storage files grow large, the invention contemplates that these files may individually and internally be even further reduced, so long as the reduction "product" is still capable of informing a reviewing party about the nature of the document content from which the extracted information was first drawn.

Various illustrations are provided herein, and are discussed to illustrate the breadth of capability offered by the apparatus and method of this invention. These illustrations should be understood to be representative of the practice and the structure of the invention, and not exhaustive or limiting of its scope of implementation.

DETAILED DESCRIPTION OF THE INVENTION

Figure 1:
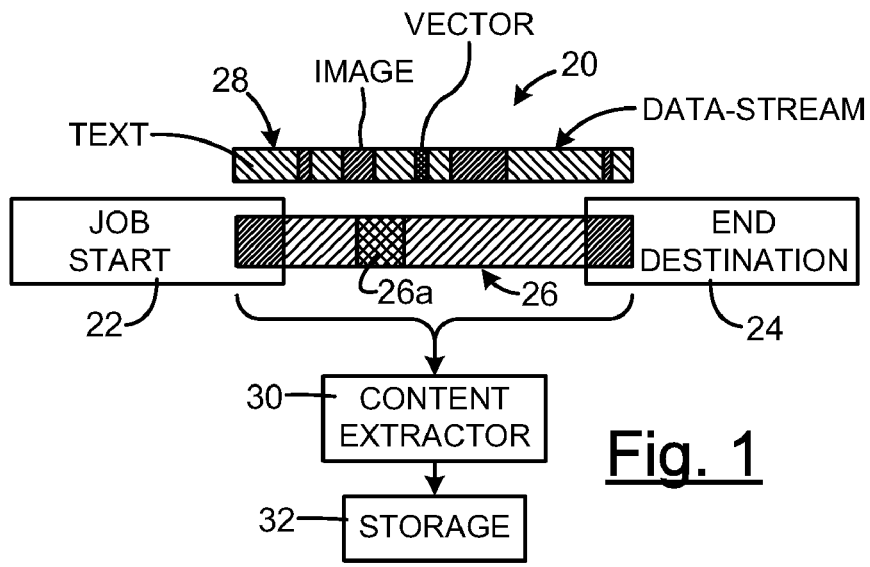
FIG. 1 is a high-level block/schematic diagram fully illustrating the overall structure and methodology of the present invention.

The apparatus and methodology proposed by the present invention direct attention to the fact today that the operations of document printing and scanning are typically not audited in a way that would allow an appropriate user, such as a manager, to review a record of exactly what document content has been printed, copied, faxed, e-mailed, and/or scanned. Without such a record, managers, administrators and others who may be responsible for keeping track of these things, cannot easily detect or trace back any misuse of printing/copying/faxing/e-mailing/scanning devices.

The present invention, in this current setting, proposes a novel system (apparatus) and related methodology which, through the relatively simple incorporation of appropriate, conventionally designable computer software, can create what is referred to herein as a document-content audit trail of information selectively extracted from document data in a data stream, with such extracted content information being sufficient to inform a later reviewer about just what was the content of a particular document which has in the past been subjected to a printing, scanning, etc. operation. The term "data" as employed herein is intended to mean data of the type which is embedded in a suitable computer-readable medium. The invention contemplates the extraction for audit-trail retention of text, vector and imagery contents in a document, and various specific extraction approaches can be employed, basically anywhere from the beginning to the ending within a document data stream that is involved in printing, copying, faxing, e-mailing and scanning activity, with a sufficiently reduced data size that this information can easily and comfortably be stored for long periods of time for the purpose of enabling later reviews of prior activities.

For example, in a multi-page document, one might choose to extract information simply from a title page, or selectively from full text components that appear in several pages, or from text extracted from an image via optical character recognition, whose for-audit-trail extracted information will, collectively, fully inform somebody generally about the content nature of the document involved.

Extraction can also easily take place with respect to pictorial imagery, such as photographic imagery, or rasterized imagery, by selecting, for example, small sections of a photograph for audit-trail retention, reduced resolution versions of all or a part of such photographic content, retention based on looking at, for example, the luminance channel only in a color image, and so on.

Storage of audit-trail information can also employ sequential steps of first extraction of selected document data, and then subsequent, and further size-reducing, abstraction of and from this extracted material before storage. Additionally, it is entirely within the contemplation of this invention that, over time, where audit-trail stored information may begin to occupy a noticeably large-volume storage space, the same general procedures employed during first, or initial, extraction and storage can be re-applied to previously extracted material for further reducing storage volume.

Those generally skilled in the art will recognize that the practices contemplated by the present invention, many illustrations of which will now be discussed, and are illustrated herein, can be performed utilizing quite conventional and selectively different, basically software approaches to implementation. For this reason, and because of the fact that practice of this invention is not dependent in any manner upon any specific software algorithmic approach, no algorithmic details are specifically provided herein.

FIG. 1 in the drawings generally illustrates the overall system, apparatus and methodology proposed by, and operating within the scope of, the present invention. This system and methodology presentation is shown generally at 20 in FIG. 1. As illustrated in this figure, a document-related job, which may be a printing job, a scanning job, a faxing job, an e-mailing job, or a copying job, etc., begins with user implementation at a job initiator, which is generally illustrated in FIG. 1 by the block labeled "JOB START" 22.

Where a particular document job involves printing, block 22 is referred to as a print job initiator, and where, as another illustration, a document job begins as a scanning job, block 22 represents what is referred to herein as a scan job initiator.

Such an initiated job has what is referred to herein as a job destination, which might, for example, be (a) the marking engine in a printer, or (b) certain software and hardware which is assigned the task of placing job data out over a network, such as a local area network, or the Internet. Such a job destination is indicated in FIG. 1 at 24 in a block which is labeled "END DESTINATION".

Extending functionally and structurally between the job initiator and the job destination, and represented by a long and variously shaded block, or rectangle, 26 in FIG. 1 are various kinds of intermediate structure which effectively form a job-transmission communication path between the initiator and the destination. Block 26 is referred to herein as document data-stream structure. Where block 26 overlaps with blocks 22, 24, dark shading is employed to represent the operative couplings that exist between this intermediary structure and blocks 22, 24. Cross-shaded sub-block 26a within block 26, positioned intermediate blocks 22, 24, is intended to represent the likely presence, within this intermediary structure, of additional specific conventional software and hardware elements, such as spooler, a print processor, a print assist, a print server, an imaging processor, an imaging assist and an imaging server, as well as perhaps other conventional intermediary agencies. Sub-block 26a is thus intended to represent, selectively, any one or any multiple collection of such intermediary structural and software elements.

Indicated in FIG. 1 by an elongate overhead block 28 which is subdivided, as shown, by various shading modalities, is a graphic representation of a document job data-stream.

Within data-stream 28, and as is reflected therein by the three different characteristic shadings that are employed, are certain regions of document content which are text regions, or vector regions, so marked in FIG. 1, and other regions which are image regions, such as pictorial-image regions, bit-mapped or rasterized, also so marked in FIG. 1. As was mentioned earlier, practice of the present invention involves selective extraction for audit-trail retention purposes of reduced-data surrogates or representations of these different kinds of information content which are present in a job data-stream, such as data-stream 28.

Indicated at blocks 30, 32, respectively, in FIG. 1 are a data-stream extractor structure, and appropriate audit-trail, retained-information storage structure.

In general terms, content extractor 30 is enabled, in any suitable fashion, to "tap into" a document data-stream, such as data-stream 28, at any point along the flow of that data-stream, beginning with the job initiator 22, ending with the job destination 24, and including locations at or intermediate any of the intermediary structure represented by block 26 and sub-block 26a in FIG. 1. The content extractor is appropriately designed, and selectively so in various different ways, to draw from a data-stream, such as data-stream 28, any selected content characteristic of the text and imagery constituent elements in the data-stream, for transfer to and storage in storage structure 32. For example, and as was suggested earlier herein, a title page in a multi-page document might be a selected topic for audit trail extraction and retention if a user of this invention determines that the retention of the information on such a page would fully inform a later reviewer about the nature of the document involved. Full and different and distributed selected pages in such a multi-page document might also be the target for extraction and audit trail retention. Fragments of language from different parts in the data-stream might be selected as being sufficient to reveal content characteristics. Also, certain full or partial images in the document data-stream might be selected, and in this regard, selected imagery content might be extracted in the form of a reduced-resolution surrogate from an entire image, a reduced-resolution fragment of an image, and/or a reduced, characteristic replication of all or a part of an image, such as might be involved in the selection of the luminance channel only of a color image.

Thus, one can see that a very large range of selectivity is afforded a user practicing the present invention with respect to just how to call for the extraction and retention of content surrogate information for storage in a device, such as device 32.

Figure 2:
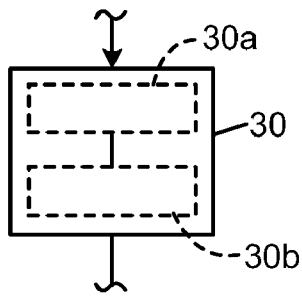
FIG. 2 is a view illustrating a modified form of the invention, wherein content extraction includes the performance of a later-abstracting relative to previously extracted information for the purpose of maximizing the usability of storage space which is employed to receive and store audit-trail, reduced-content data in accordance with the invention.

FIG. 2 illustrates one modified form and practice of the present invention, wherein, within content extractor block 30, two different kinds of activities, represented by dashed rectangles 30a, 30b in FIG. 2, take place. In this modification, block 30a within block 30 represents structure and software which performs initial or original data-content extraction from a data-stream, like data-stream 28. Block 30b represents structure and software which performs any selected kind of information abstraction drawn from material extracted originally by block 30a. What results from the activity, the abstraction activity, that is, of block 30b is suitably furnished to storage, such as is represented by block 32 in FIG. 1.

Figure 3:
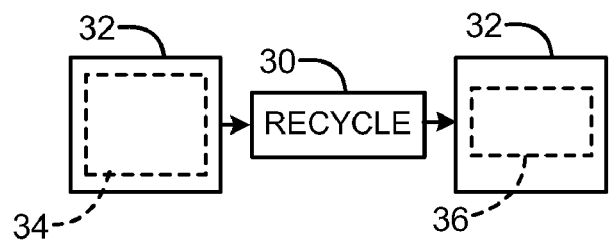
FIG. 3 is a block/schematic diagram illustrating a modification of the invention which involves recycling in relation to data extraction and storage, whereby, over time, prior-extracted, reduced-content information may be further reduced in size.

FIG. 3 show yet another modified structure and practice of the invention wherein extractor block 30, now given the re-labeled title"RECYCLE" in FIG. 3, is enabled, from time to time, to "tap into" audit trail information retained in storage 32. Such information is represented by a dashed block 34 in FIG. 3. This "tapping into" would typically be done for the purpose of implementing a further extraction and data-size reduction of content 34 for re-storage in storage 32. Reduced "re-storage" is shown by dashed block 36 on the right side in FIG. 3.

Figure 4:
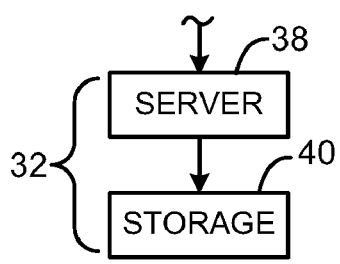
FIGS. 4, 5 and 6 each shows one of a number of different storage possibilities employable in accordance with the invention to store extracted, reduced-content document information (text and imagery).
Figure 5:
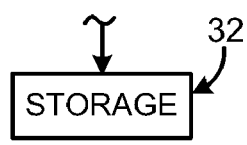
Figure 6:
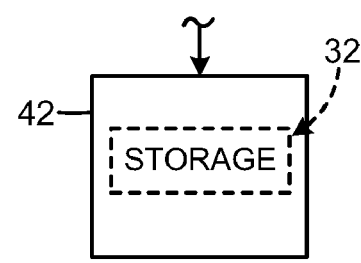

FIGS. 4-6, inclusive, are provided simply to suggest the relatively wide range of storage possibilities which may be selected conveniently for reception of audit-trail content information created in accordance with practice of this invention. In FIG. 4 overall storage, still represented by reference numeral 32, here involves initial feeding of content extracted information over a network to a server 38, which then supplies extracted information for storage to a storage site designated 40 in FIG. 4. FIG. 5 simply represents the fact that storage structure 32 may be a completely stand alone and outboard storage facility. FIG. 6 reflects the possibility that storage 32 may form part of one of the constituent structural elements in the system pictured in FIG. 1, such an MFP device represented in FIG. 6 by a block 42.

Obviously, there are many available choices for the selection of a suitable destination storage location for audit-trail-extracted data-content information.

From the systemic and methodologic discussion and illustration of this invention which has just been given above, attention is now directed to FIGS. 7-16 in the drawings, which are presented in block and schematic form, with detailed text labeling, which drawings are believed to be quite self explanatory illustrations of various specific manners of implementing practice of the present invention in a variety of different representative settings. Accordingly, these drawing figures are now just simply generally identified to describe the particular settings and modalities of invention practice which they represent, without there being any need for an elaborated discussion of any of these figures.

Figure 7:
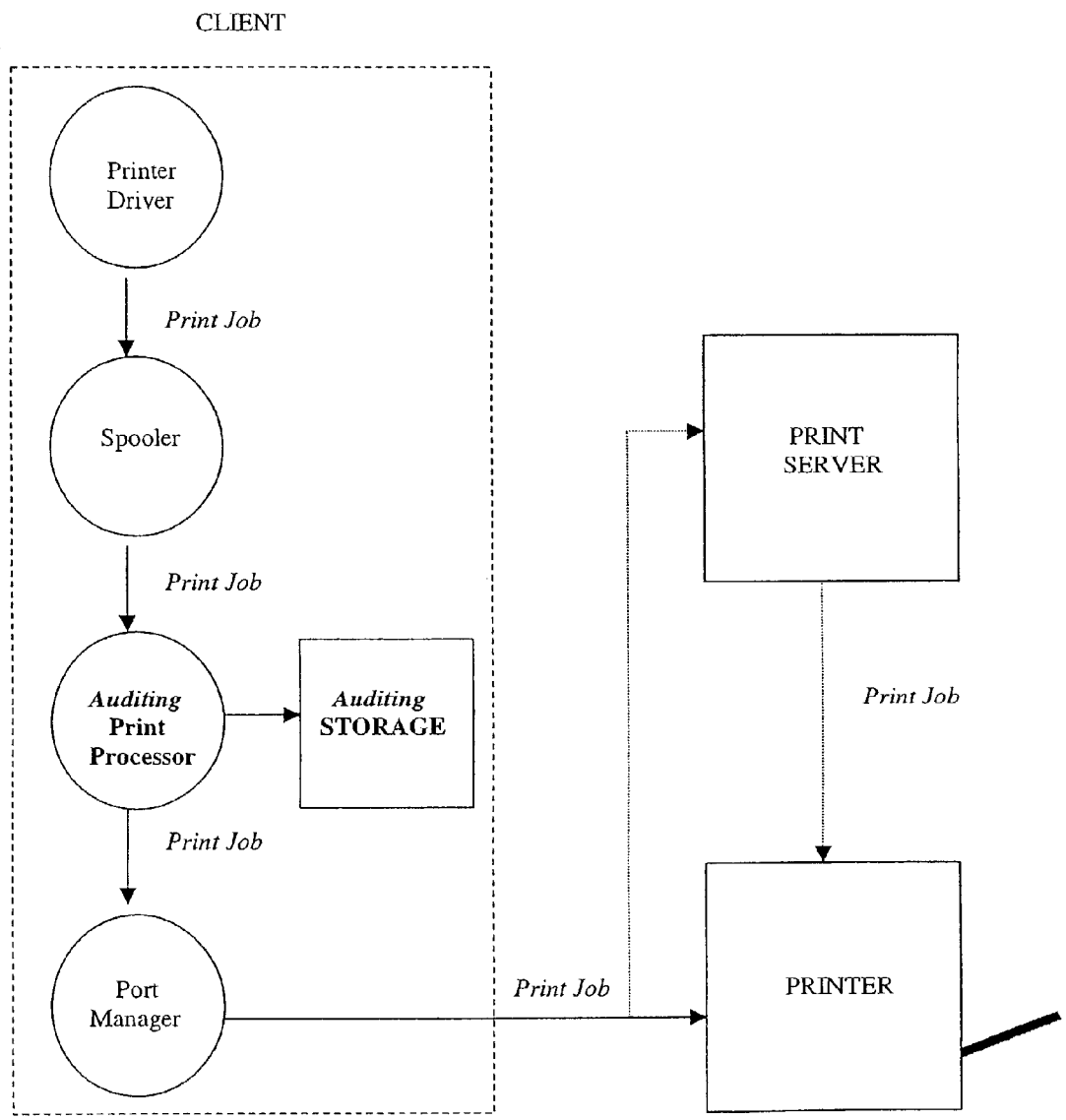
FIG. 7 is a block/schematic diagram illustrating what is referred to herein as a Print Processor Based Audit Trail-Client Side implementation of the invention.

FIG. 7 illustrates an implementation of the present invention in a setting referred to herein as Print-Processor-Based Audit Trail—Client Side. Here, deployed vertically at the left side of this figure, is the structural and software path progressing downwardly in the figure, that defines at least a portion of what is represented in FIG. 1 by block 26, and here one can see that data extraction essentially takes place at or near the location of a print processor, such as a print processor present in the Microsoft® Windows® operating systems.

Figure 8:
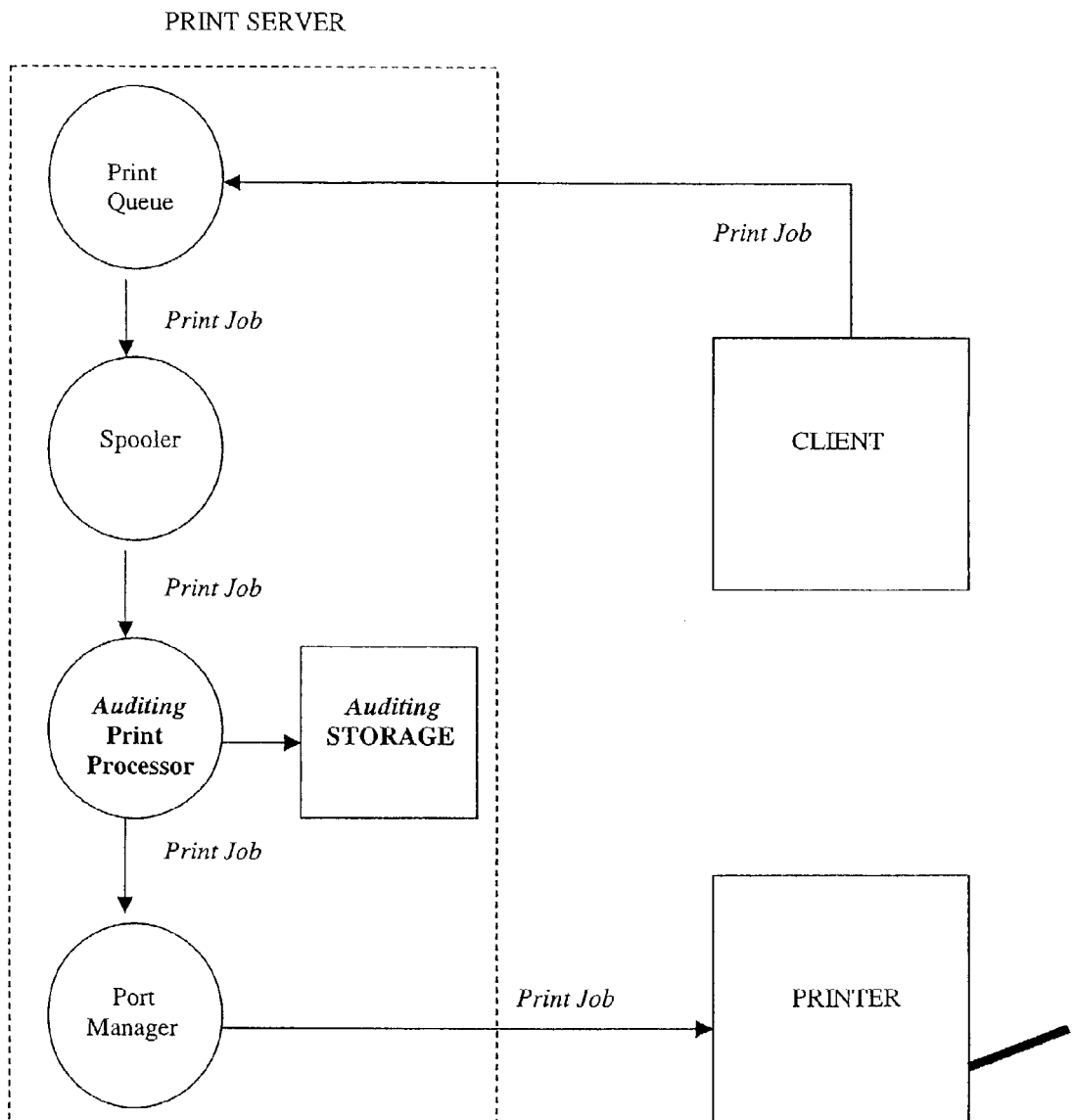
FIG. 8 illustrates an implementation of the invention referred to as Print-Processor-Based Audit Trail—Server Side.

FIG. 8 illustrates an implementation of the invention in a setting referred to as Print-Processor-Based Audit Trail—Server Side. As can be seen, what is thus illustrated in FIG. 8 is very similar to what is shown in FIG. 7, and here also, data content extraction takes place at or in the close vicinity of a print processor.

Figure 9:
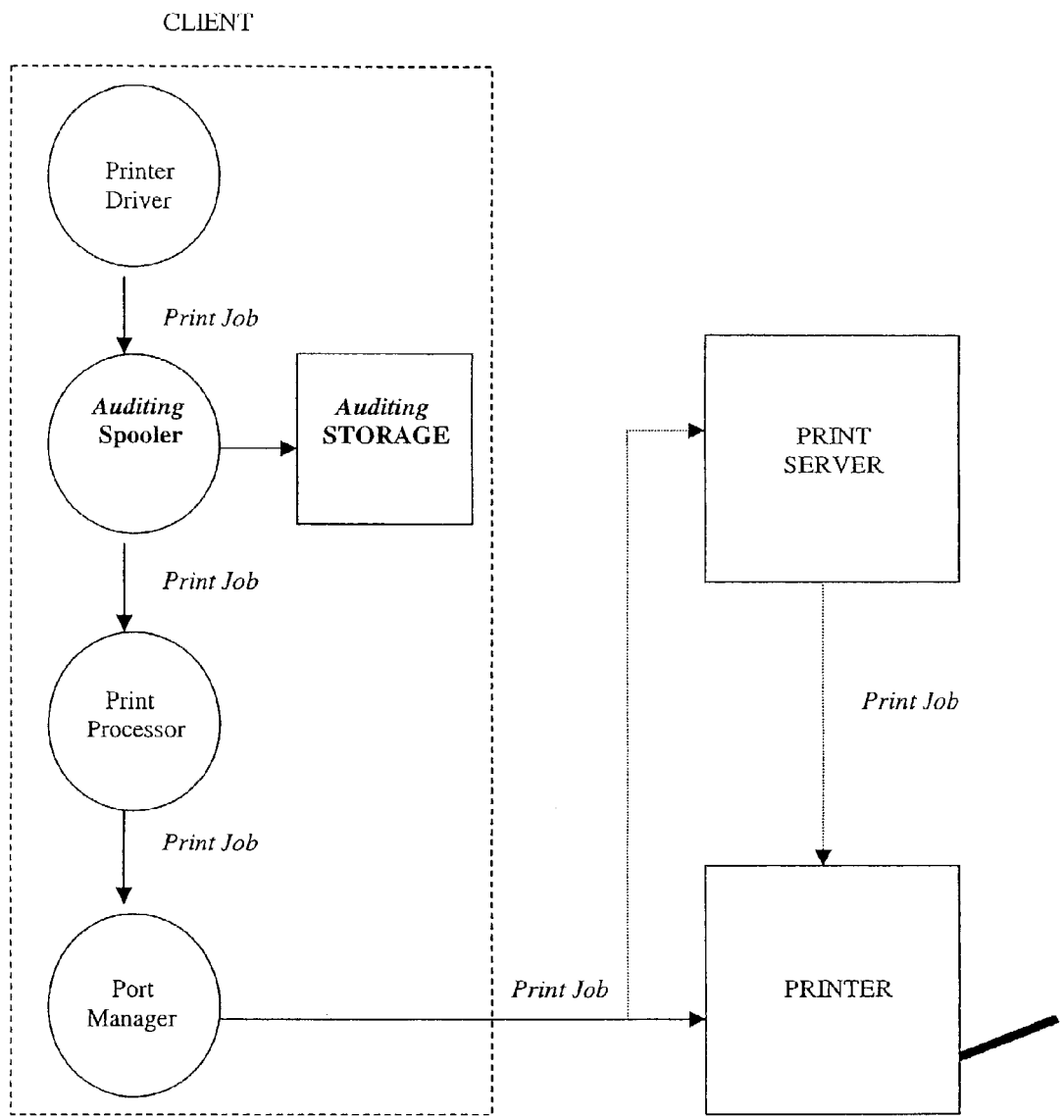
FIG. 9 is a block/schematic drawing illustrating another implementation of the invention, here referred to as Spooler-Based Audit Trail—Client Side.

FIG. 9 depicts practice of the invention in a setting referred to herein as Spooler-Based Audit Trail—Client Side. Again, the flow path for a job data-stream progresses downwardly along the left side of what is shown in FIG. 9, with audit-trail data-content extraction here taking place at or in the close vicinity of a spooler.

Figure 10:
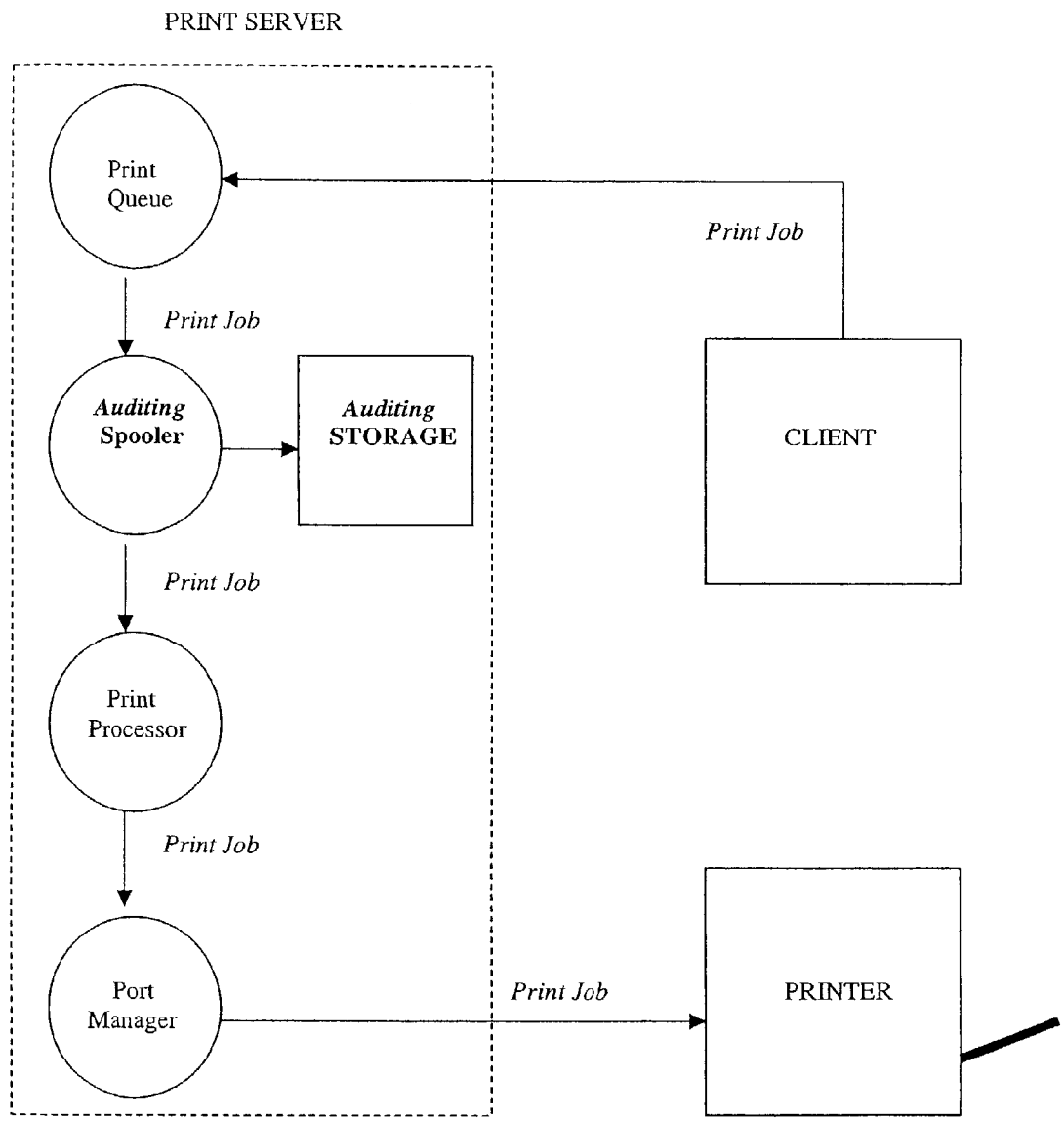
FIG. 10 shows in block/schematic form, an implementation of the invention referred as Spooler-Based Audit Trail—Server Side.

FIG. 10 illustrates a setting for practice of the present invention referred to as Spooler-Based Audit Trail—Server Side. This figure, as can be seen, is quite similar to FIG. 9, and here, also, data extraction for audit-trail retention purposes is performed at the location of, or very near, a spooler.

Figure 11:
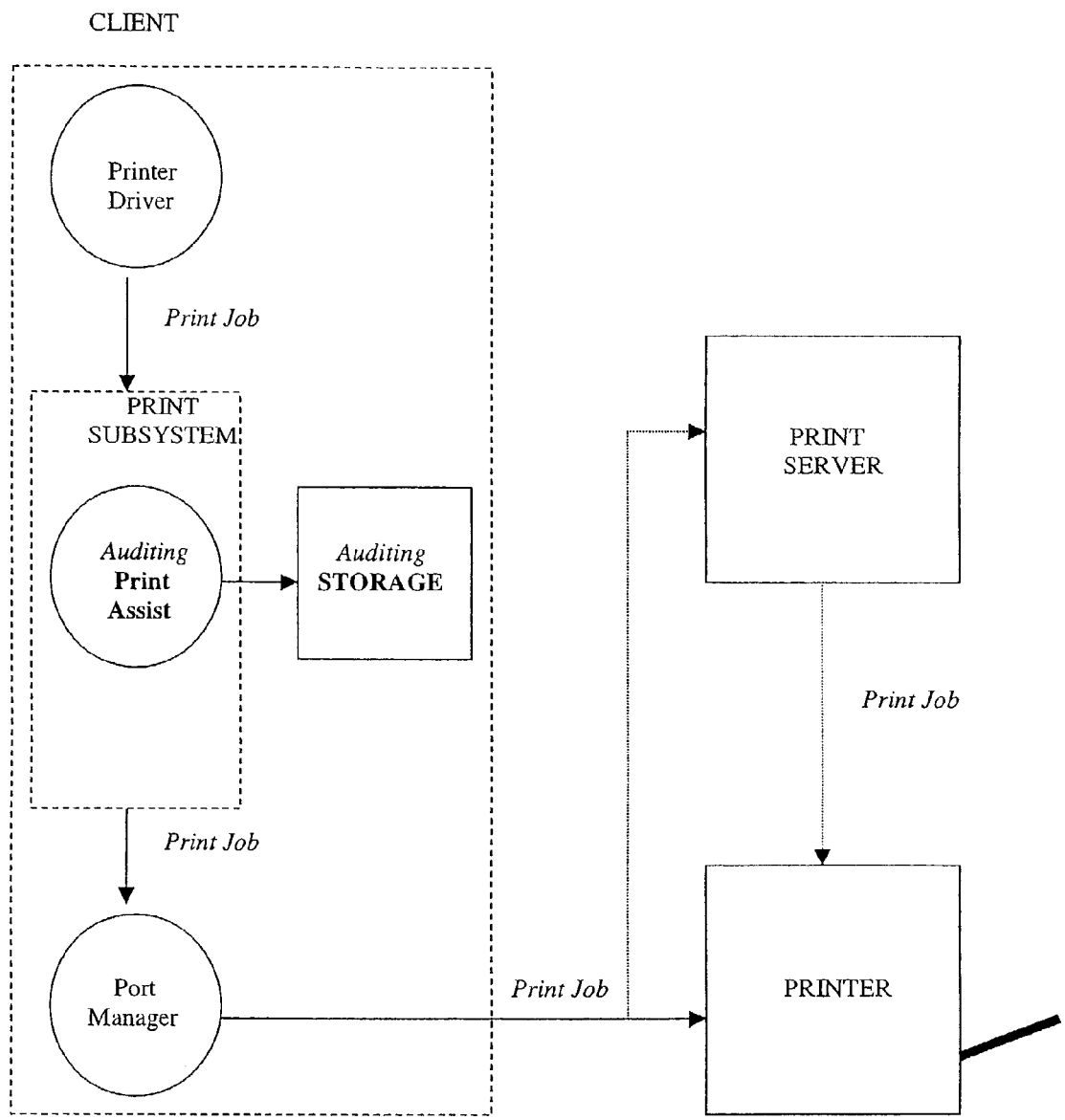
FIG. 11 is a block/schematic illustration of an invention implementation herein referred to as Print-Assist-Based Audit Trail—Client Side.

FIG. 11 pictures another implementation of the present invention in a document-job-handling setting referred to as Print-Assist-Based Audit Trail—Client Side. A document data-stream flow takes place downwardly along the left side of FIG. 11, and from this data-stream, audit-trail-extracted information is drawn form the vicinity of a print assist.

Figure 12:
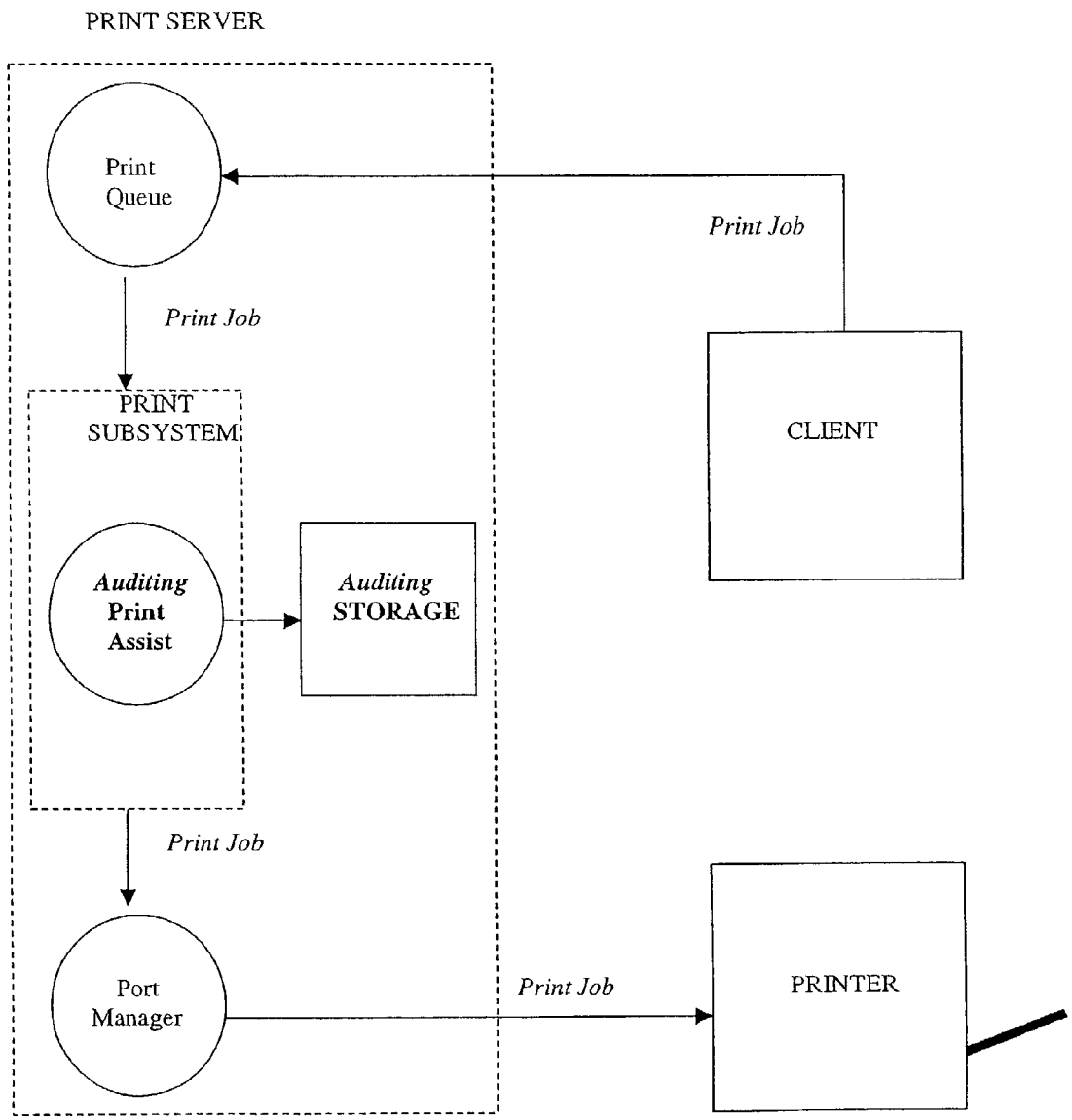
FIG. 12 shows yet another implementation of the invention in an arrangement referred to herein as Print-Assist-Based Audit Trail—Server Side.

FIG. 12 presents yet another implementation of the invention, very similar to one pictured in FIG. 11, and here referred to as Print-Assist-Based Audit Trail—Server Side, wherein, as was true with respect to what is shown in FIG. 11, extracted data which will be retained and stored as part of a content audit trail, takes place at the location, or in the vicinity, of a print assist, where a print assist is any component added to a print subsystem between the job source and the job destination.

Figure 13:
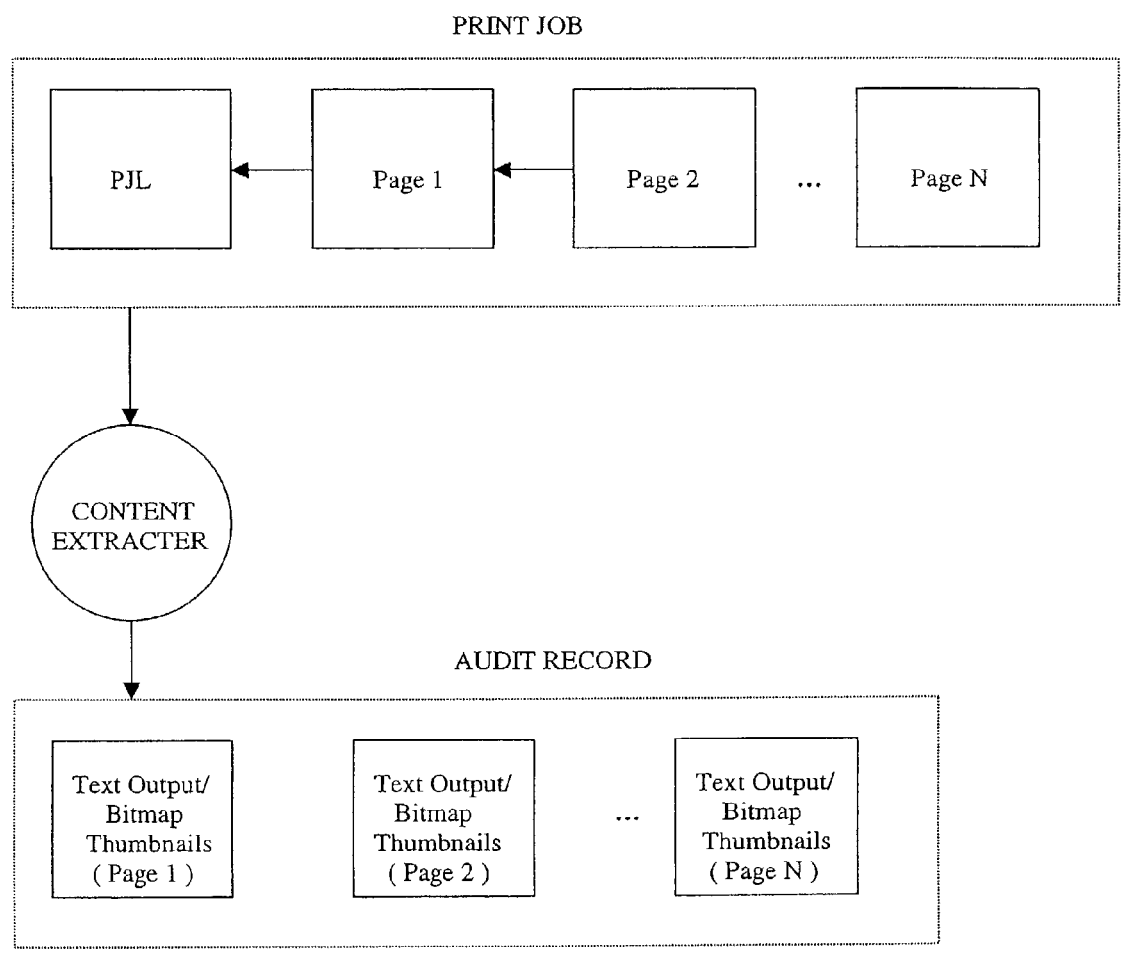
FIG. 13 illustrates generally, in block/schematic/flow diagram form, a practice of the invention referred to herein as Audit Trail—Print Job.

FIG. 13 is a block/schematic flow diagram generally illustrating one practice of content extraction to create from a print job an audit record, and this illustration is referred to as a practice trail referred to Audit Trail-Print Job.

Figure 14:
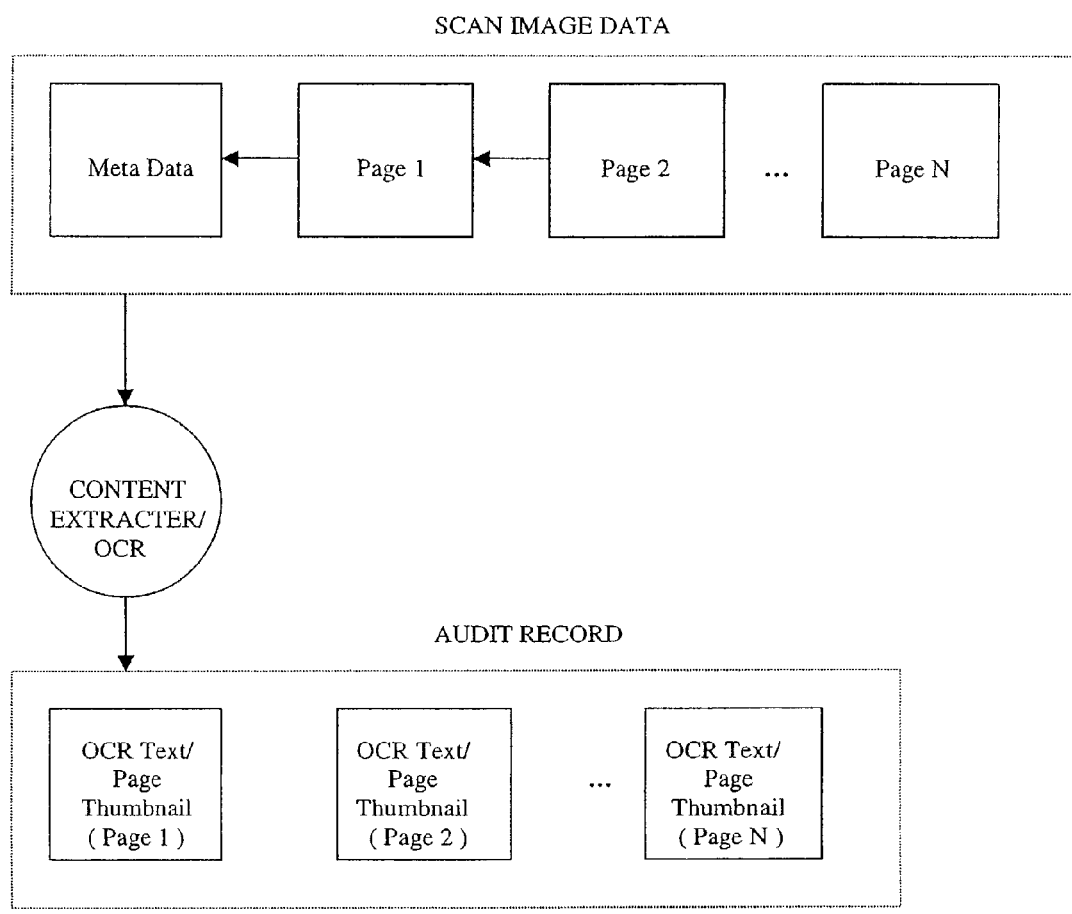
FIG. 14 shows an implementation of the invention which is somewhat similar to that illustrated in FIG. 13, but here specifically showing what is referred to as an Audit Trail—Scan Job Version of the invention.

FIG. 14 is somewhat similar to FIG. 13 in that it pictures a particular data extraction modality, and what is shown here is referred to as Audit Trail—Scan Job Extraction Practice.

Figure 15:
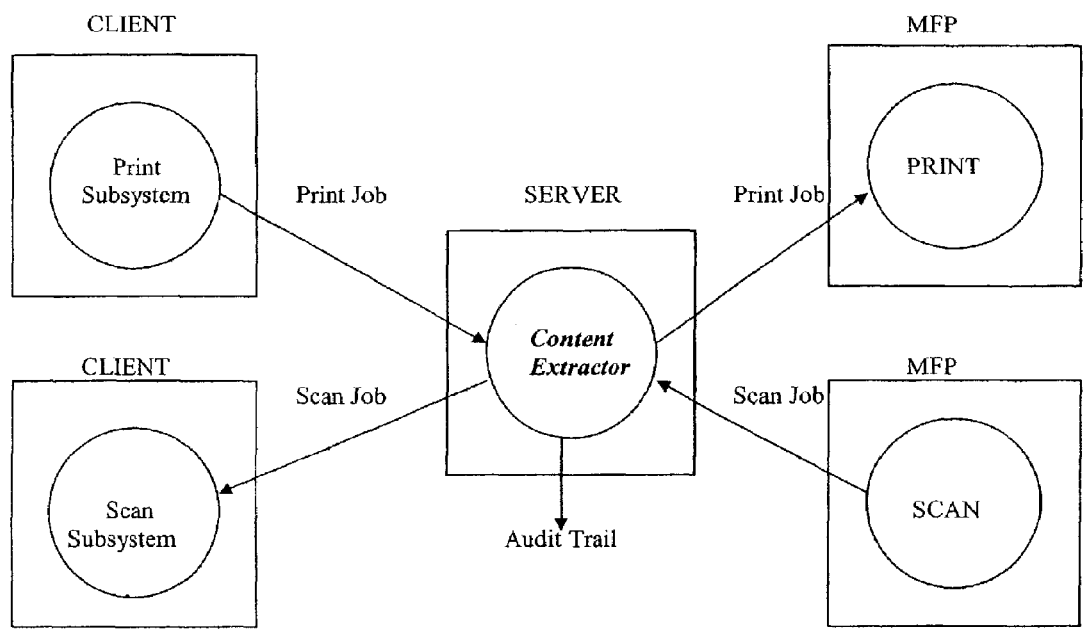
FIG. 15 illustrates, at a high diagrammatic level, practice of the invention in a setting referred to as Audit Trail on Network Server.

FIG. 15, as was mentioned earlier, is a high-level schematic diagram illustrating a practice referred to as Audit Trail on Network Server.

Figure 16:
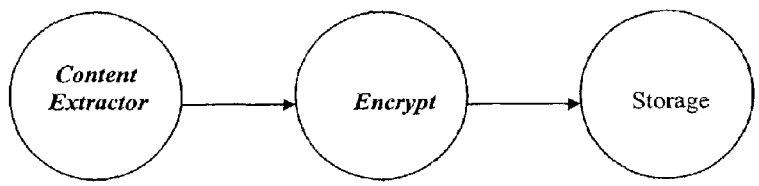
FIG. 16 furnishes a simple block/schematic diagram illustrating a modified practice of the invention which employs data encryption en route between a content extractor and a storage site for audit-trail data.

Finally, FIG. 16 is a high-level schematic diagram illustrating the enabled possibility for the introduction of encryption (and, of course, subsequent decryption) of audit-trail extracted data.

Accordingly, a preferred and best mode embodiment of, and manner practicing, the present invention have been fully described and illustrated herein. A large number of variations and practice modalities have also been illustrated and described, and those generally skilled in the art will recognize from all of this that other variations and modifications based upon the fundamental practices proposed by the present invention are certainly possible, and these may be and well within the scope of the present invention.

We claim:

1. Apparatus for creating a content-informative audit trail, including subject-representative reduced-image content, in relation to the implementation of a document-data data-stream which has been initiated by a user with regard to invoking an imaging job, said structure comprising
    a job initiator,
    document data-stream structure disposed to convey, and/or have access to, a collection of document data generated from said job initiator and deliverable and/or delivered to a job destination,
    functional elements within said data-stream structure intermediate said job initiator and the mentioned destination, including at least one of (a) a spooler, (b) an imaging processor, (c) an imaging assist, and (d) an imaging server, and
    data-stream content extractor structure operatively associated with said data-stream structure, operable to extract, from a region in said data-stream structure which is effectively located adjacent one of said functional elements, and to effect the retention of, a selectively retrievable audit-trail sub-collection of reduced-size, but nonetheless functionally informative, data-collection content surrogates, said extractor structure, with respect to the extraction of imagery content, functioning to perform such extraction utilizing techniques drawn from the list including (a) reduction of resolution, and (b) focus on luminance without focus on color.

2. The apparatus of claim 1 wherein the imaging job takes the form of at least one of (a) a print job, (b) a scan job, (c) an e-mail job, (d) a copy job, and (e) a fax job.

3. The apparatus of claim 1 wherein said job initiator takes the form of at least one of (a) a print job initiator, (b) a scan job initiator, (c) an e-mail job initiator, (d) a copy job initiator, and (e) a fax job initiator.

4. The apparatus of claim 1, wherein said extractor structure is coupled to said data-stream structure to extract data-collection content from substantially the location of said job initiator.

5. The apparatus of claim 1, wherein said extractor structure is coupled to said data-stream structure to extract data-collection content from a location which is effectively intermediate said job initiator and the mentioned destination.

6. The apparatus of claim 1, wherein said extractor structure is coupled to said data-stream structure to extract data-collection content generally from substantially the location of the mentioned destination.

7. The apparatus of claim 1, wherein the data-collection content which is extracted by said extractor structure includes text, vector information, and imagery.

* * * * *